Dec. 30, 1930.   H. J. GROW   1,787,247
METHOD OF SHAPING EDGES FOR FUSION WELDING
Filed Nov. 30, 1929   2 Sheets-Sheet 1

INVENTOR
Harold J. Grow
BY
ATTORNEY

Dec. 30, 1930.  H. J. GROW  1,787,247
METHOD OF SHAPING EDGES FOR FUSION WELDING
Filed Nov. 30, 1929  2 Sheets-Sheet 2
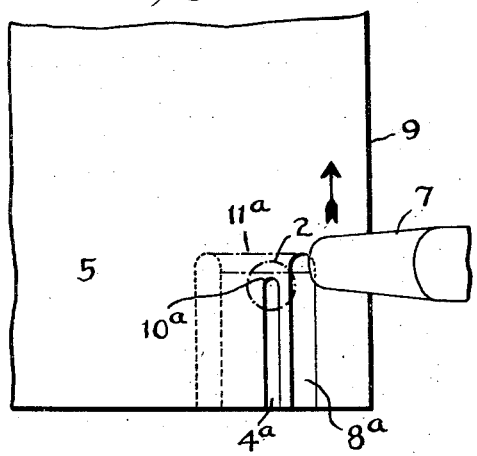
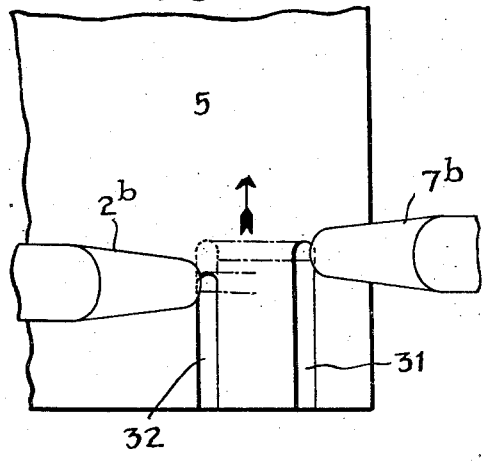
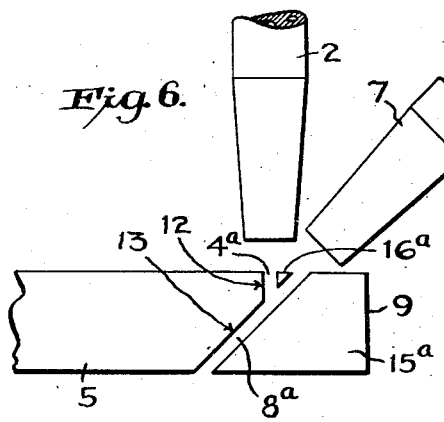
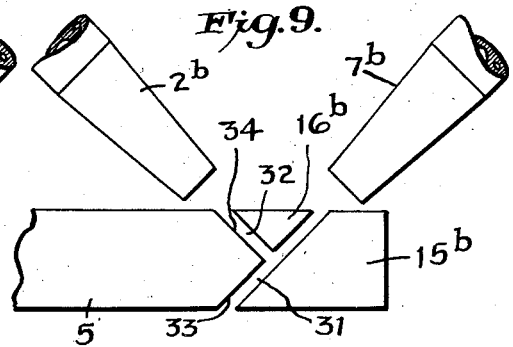
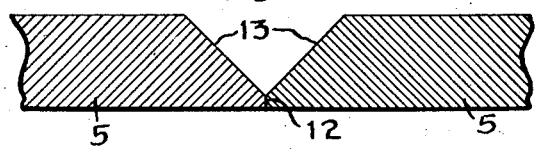
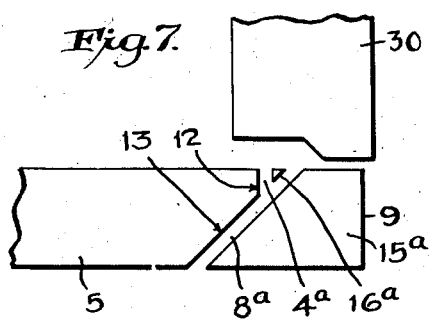
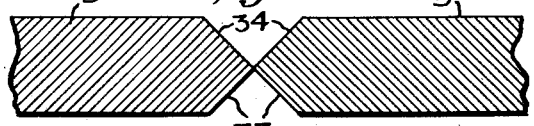
INVENTOR
Harold J. Grow
BY
ATTORNEY Patented Dec. 30, 1930

1,787,247

UNITED STATES PATENT OFFICE

HAROLD J. GROW, OF EAST ORANGE, NEW JERSEY, ASSIGNOR TO AIR REDUCTION COMPANY, INCORPORATED, OF NEW YORK, N. Y., A CORPORATION OF NEW YORK

METHOD OF SHAPING EDGES FOR FUSION WELDING

Application filed November 30, 1929. Serial No. 410,672.

The invention relates to a method of shaping the edges of ferrous metal sheets and plates by the oxygen cutting process. More specifically the invention relates to a method whereby an iron or steel sheet or plate is given a double beveled edge or a combination perpendicular and beveled edge in one operation. This method affords an economical and rapid means of uniformly shaping the edges of sheets and plates to produce an edge having two faces in angular relation to each other. The particular purpose for which edges are so prepared is to facilitate the welding of two such edges together by fusion welding.

Heretofore it has been the practice, when using a cutting torch to prepare such edges for welding, to make two separate and independent cuts. One cut is usually made in a plane perpendicular to the surface of the plate and the second cut is made parallel to the edge of the first cut but in a plane at a suitable inclination to the plate surface and in such a manner as to allow a small amount of the perpendicular cut surface to remain at the bottom of the angular cut. When two plates are cut in this manner and the edges so cut are placed in approximate abutment, a V shaped groove is left at the top of the joint (see Fig. 10). For certain classes of work this is the ideal method of preparation for welding, particularly when the welding is to be done from one side only. When plates are to be welded from both sides, as in the case of heavy plates, it is usually desirable that the edges of the plates be beveled on both sides to form a double V (see Fig. 11).

The invention set forth herein is a method of making simultaneously two parallel cuts in planes which intersect within the thickness of the metal. One of the cuts forms one face of the edge to be shaped, while the other cut forms the other face meeting the first at an angle. The manner in which this is accomplished is such that the axial path of each oxygen jet is uninterrupted in its required penetration through the metal. The significance of this is that while it has been demonstrated that under certain conditions the action of an oxygen jet will continue after passing through an intervening air space, the quality and accuracy of a cut so made is much impaired. The plan adopted herein is to advance the two cuts substantially side by side but with the breast of the cut which shapes the lower of the two edge faces slightly ahead of the point where the breast of the cut which shapes the upper face meets the first cut, "lower" and "upper" being used, respectively, in the sense of farther from and nearer to the orifices from which the cutting jets are delivered. Furthermore, the jets are so directed that they come reasonably close together within the metal. This keeps the slag from the two cuts fluid so that each jet continually clears itself without interference by frozen slag or oxid.

Following is a brief description of the accompanying drawings.

Figure 1:
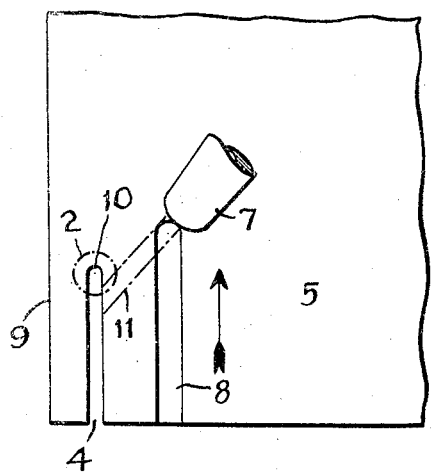
Fig. 1 is a plan view of a portion of a plate showing the edge shaping cuts in process of being made, the position of the cutting nozzles making a perpendicular cut being indicated by a dotted circle and a fragment of the other cutting nozzle being shown in full lines.

The foregoing views illustrate the shaping of an edge consisting of a beveled face and a perpendicular face. In these cases the penetration of the oxygen jets is from base to apex of the bevel.

Fig. 5 is a plan view and Fig. 6 is an elevation illustrating a form of execution in which the penetration of the jets is from apex to base of the bevel.

Fig. 7 is a view similar to Fig. 6 illustrating the fact that the jets to form the simultaneous cuts may be delivered from the tip of a single specially designed torch.

Figs. 8 and 9 are, respectively, a plan view and an elevation illustrating the application of the invention to the shaping of a double bevel edge.

Fig. 10 is a section showing the edge portions of the two plates shaped as in Figs. 1 to 7 placed in abutment preparatory to single V welding.

Fig. 11 is a similar view showing two plates provided with double bevel edges by an operation such as represented in Figs. 8 and 9, preparatory to double V welding.

In Figs. 1 to 6 the torch tip 2 delivers from its passage 3 the oxygen jet which makes the perpendicular cut 4 in the plate 5. The numeral 6 designates the customary heating jet passages which deliver flame jets of oxygen and fuel gas. The torch tip 7 delivers the oxygen jet which makes the laterally inclined cut 8.

It will be apparent that in these and other views the two torches are to be kept in the same positions relative to each other throughout the operation and are to be moved at uniform speed in the direction of the arrows of the plan views entirely across the plate or sheet parallel with its original edge 9. Suitable means for supporting the torches in fixed relation to each other and for propelling either the torches or the work at the required even speed will be understood.

In Fig. 1 the point where the jet making the inclined cut first strikes the metal is always ahead of the breast 10 of the perpendicular cut, but the axial path 11 of the jet is inclined rearwardly as well as laterally so that it comes into the perpendicular cut a short distance behind said breast.

The function of the perpendicular cut is to make the perpendicular face 12 on the new edge of the plate. In Figs. 1 to 4 the perpendicular cut is made completely though the thickness of the metal, and it is the lower portion of one of the walls which is preserved as the perpendicular face 12 of the shaped edge. The jet producing this cut always travels through solid metal from top to bottom of the plate. The inclined cut 8 is also not required to cross an air gap in penetrating the distance necessary to form the beveled face 13 of the new edge. Uncombined oxygen of this jet enters the perpendicular cut and while it may affect the wall 14 of this cut it does not affect the face 12. Since the wall 14 belongs to the piece 15, which is waste, it is of no consequence whether part of it is destroyed or not, whereas it is highly important that the already formed face 12 of the new edge of the plate remain intact.

Figure 2:
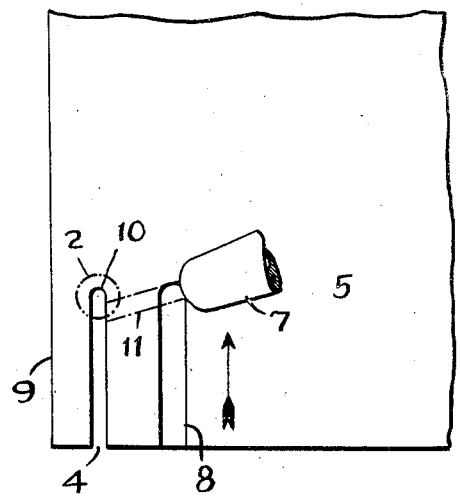
Figs. 2 and 3 are similar views illustrating different positionings of one of the nozzles. Broken lines in these views illustrate various directions in which the jet forming the inclined cut may penetrate the metal.
Figure 4:
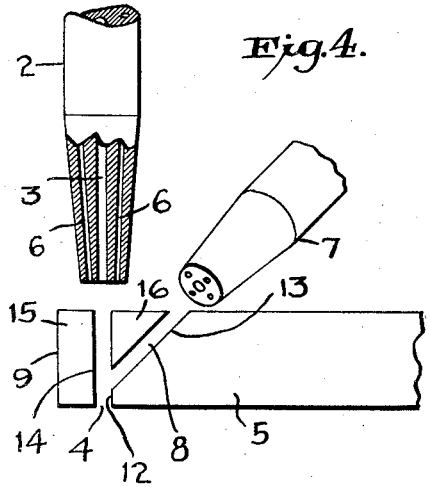
Fig. 4 is an elevation looking in the direction of the arrow in Fig. 1, portions only of the torch tips being shown, one in elevation and the other partly in longitudinal section. Similar elevations corresponding to Figs. 2 and 3 would differ in the fore-shortening of the inclined nozzle.

In Fig. 2 the same results are accomplished with an arrangement whereby the two jets are abreast of each other where they attack the metal on top, but as in Fig. 1, the jet responsible for the laterally inclined cut issues into the perpendicular cut behind the breast of that cut.

Figure 3:
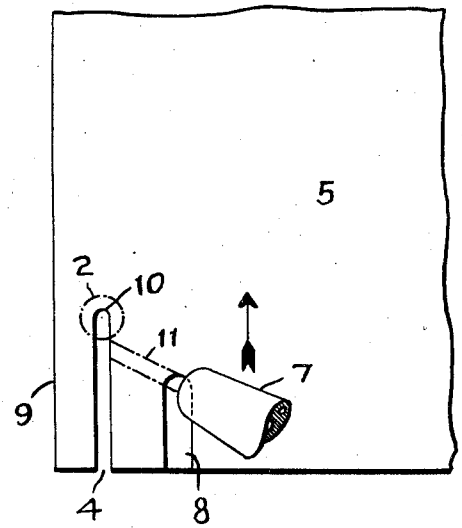

In Fig. 3 the point of attack of the diagonal jet is behind the breast of the perpendicular cut, but its path ranges forwardly as well as laterally so as to meet the vertical cut a little behind its leading end or breast.

These arrangements are illustrative. It will be observed that the plan in all these cases is essentially the same.

In Figs. 1 to 4, as previously stated, the direction of penetration is from base to apex of the bevel. In Figs. 5 and 6 the reverse of this is true.

In this form of execution the inclined cut $8^a$ is the one which is made all the way through the thickness of the metal, the lower portion of this cut producing the bevel face 13 of the new edge. The perpendicular cut $4^a$ is a shallow cut which meets the inclined cut to form the perpendicular face 12 of the new edge. The jet which makes the perpendicular cut will attack the underlying wall of the inclined cut to a greater or less extent, but does not injure that portion of the overlying wall which forms the bevel face 13. The wall which may be so attacked is part of the waste piece $15^a$.

In a form of the invention such as illustrated in Figs. 5 and 6, the breast of the inclined cut, represented by the broken lines $11^a$ which indicate the path of penetration of the inclined jet, is always ahead of the breast $10^a$ of the perpendicular cut.

In Figs. 1 to 4 the triangular section 16 between the cuts is waste, as is also the smaller section $16^a$ between the cuts of Figs. 5 and 6. If this section is small enough one of the two nozzles may be simply an oxygen nozzle unprovided with heating jet passages, heating jets of one torch tip in that case being sufficient to assist both oxygen jets in attacking the metal. Also two simple oxygen nozzles might be combined with one or more independent nozzles delivering preheating mixture.

Fig. 7 indicates the use of a single torch tip for making the simultaneous cuts, such tip to be provided with two cutting oxygen passages in proper relation and with suitable heating jet passages.

In Figs. 8 and 9 a double bevel edge is being produced. The torch tips $2^b$ and $7^b$ are positioned with their extremities in laterally spaced relation as in the other forms of the method constituting the invention, but both are inclined, reversely to each other, at the desired angle. One of the torches, that marked $7^b$, makes a cut 31 all the way through the metal, the path of this jet being through solid metal from top to bottom of the plate or sheet. The other oxygen jet makes a cut 32 through solid metal from the upper surface to the cut 31. The faces of the new edge are marked 33 and 34, the face 33 being the lower part of the overhanging wall of the cut 31 and the face 34 being the underlying wall of the cut 32. In making these faces neither of the oxygen jets is required to cross an air gap formed by the other slot. Referring to Fig. 8 it will be seen that the breast of the through cut 31 is always ahead of the breast of the cut 32. The pieces 15$^b$ and the triangular section 16$^b$ are waste.

While the method of the invention has been described and illustrated in connection with flat sheets and plates, it will be understood that it is equally applicable to other bent or curved sheets, and that it may be applied to the shaping of the end edges of hollow cylindrical articles such as steel pipe sections, in which cases the nozzle or nozzles would be propelled in a circular course, or the pipe section would be rotated relatively to stationary nozzles.

It will be understood that the views are somewhat schematic, being intended to illustrate the principles of the invention in a simple and easily comprehensible manner. The triangular sections 16, 16$^a$ and 16$^b$ would scarcely be left as shown by the advancing cuts. Sections as small as the sections 16$^a$ would naturally disappear, and sections such as those marked 16$^a$ and 16$^b$ would be more or less burned away. Likewise the waste pieces 15, 15$^a$ and 15$^b$ have been shown as if the cuts left them with smooth cut faces, whereas actually they would be more or less attacked. The important fact is that the operation is so conducted that all damage is confined to waste portions and that the faces of the new edge are left intact as the cuts proceed.

I claim:

1. The method of shaping the edges of ferrous metal plates and sheets to provide an edge composed of two faces in angular relation to each other, which method comprises simultaneously advancing two cuts produced by oxygen jets acting in planes which intersect within the thickness of the metal.

2. The method of shaping the edges of ferrous metal plates and sheets to provide an edge composed of two faces in angular relation to each other, which method comprises simultaneously advancing two cuts produced by oxygen jets acting in planes which intersect within the thickness of the metal, the action of each jet forming one of the faces, and maintaining the jets in such relation that each has an uninterrupted path through the metal for the formation of its face.

3. The method of shaping the edges of ferrous metal plates and sheets to provide an edge composed of two faces in angular relation to each other, which method comprises simultaneously advancing two cuts produced by oxygen jets acting in planes which intersect within the thickness of the metal, and maintaining the jets in such relation that one of them produces a cut entirely through the metal in order to form one of the faces while the other jet is directed so as to penetrate the metal in convergence to the first cut.

4. The method of shaping the edges of ferrous metal plates and sheets to provide an edge composed of two faces in angular relation to each other, which method comprises simultaneously advancing two cuts produced by oxygen jets acting in planes which intersect within the thickness of the metal, and maintaining the jets in such relation that the breast of the cut which forms the lower of the two edge faces is always in advance of the point of emergence of the jet forming the upper of the edge faces.

5. The method of shaping the edges of ferrous metal plates and sheets to provide an edge composed of two faces in angular relation to each other, which method comprises simultaneously advancing two cuts produced by oxygen jets acting in planes which intersect within the thickness of the metal, and maintaining the jets in such relation that the jet which forms the upper of the two edge faces issues into the cut produced by the jet which forms the lower of said faces a short distance behind the breast of that cut.

6. The method of shaping the edges of ferrous metal plates and sheets to provide an edge composed of two faces in angular relation to each other, which method comprises simultanously advancing two cuts produced by oxygen jets acting in planes which intersect within the thickness of the metal, and keeping the slag fluid by the closeness of approach of the oxygen jets within the metal.

HAROLD J. GROW.